(12) United States Patent
Berger et al.

(10) Patent No.: US 10,383,405 B2
(45) Date of Patent: Aug. 20, 2019

(54) DIGITAL LAST

(71) Applicant: adidas AG, Herzogenaurach (DE)

(72) Inventors: Christoph Günther Berger, Ebermannstadt (DE); Fabian Schweizer, Nürnberg (DE); Jürgen Stumpf, Künzell (DE)

(73) Assignee: adidas AG, Herzogenaurach (DE)

( * ) Notice: Subject to any disclaimer, the term of this patent is extended or adjusted under 35 U.S.C. 154(b) by 32 days.

(21) Appl. No.: 15/478,902

(22) Filed: Apr. 4, 2017

(65) Prior Publication Data

US 2017/0280828 A1 Oct. 5, 2017

(30) Foreign Application Priority Data

Apr. 4, 2016 (DE) .......................... 10 2016 205 503

(51) Int. Cl.
| | |
|---|---|
| *A43D 3/02* | (2006.01) |
| *A43D 1/02* | (2006.01) |
| *G06T 3/20* | (2006.01) |
| *G06T 3/60* | (2006.01) |
| *G06T 19/20* | (2011.01) |
| *A43D 1/04* | (2006.01) |
| *A43D 3/00* | (2006.01) |
| *G06F 17/50* | (2006.01) |

(52) U.S. Cl.
CPC .................. *A43D 3/02* (2013.01); *A43D 1/02* (2013.01); *A43D 1/025* (2013.01); *A43D 1/04* (2013.01); *A43D 3/00* (2013.01); *G06T 3/20* (2013.01); *G06T 3/60* (2013.01); *G06T 19/20* (2013.01); *A43D 2200/60* (2013.01); *G06F 17/5086* (2013.01); *G06F 2217/12* (2013.01)

(58) Field of Classification Search
CPC .................................. A43D 3/02; A43D 3/021
USPC ............................................... 12/133, 146 L
See application file for complete search history.

(56) References Cited

U.S. PATENT DOCUMENTS

| | | | |
|---|---|---|---|
| 3,696,456 A | 10/1972 | Dunham et al. | |
| 4,817,222 A | 4/1989 | Shafir | |
| 5,231,723 A * | 8/1993 | White ..................... | A43D 1/04 12/133 R |
| 5,339,252 A * | 8/1994 | White .................... | A43D 1/025 12/146 L |
| 5,661,864 A * | 9/1997 | Valiant .................... | A43D 3/00 12/133 R |
| 5,718,013 A * | 2/1998 | Gumbert ................ | A43D 3/021 12/133 R |

(Continued)

FOREIGN PATENT DOCUMENTS

| | | |
|---|---|---|
| CN | 101711614 A | 5/2010 |
| DE | 2 208 1 12 | 7/1982 |

(Continued)

*Primary Examiner* — Ted Kavanaugh
(74) *Attorney, Agent, or Firm* — Sterne, Kessler, Goldstein & Fox P.L.L.C.

(57) ABSTRACT

A method and corresponding apparatus is disclosed for generating a digital last for the manufacture of a shoe for a person. The method comprises obtaining a predefined digital last, the predefined digital last comprising an axis relating to the shape of the last; obtaining data of a foot of the person; and modifying the obtained predefined digital last based on the obtained data, wherein modifying comprises at least one of translation and rotation of the axis.

13 Claims, 6 Drawing Sheets

(56) References Cited

U.S. PATENT DOCUMENTS

| | | |
|---|---|---|
| 8,005,558 B2 | 8/2011 | Waatti et al. |
| 2004/0168329 A1 | 9/2004 | Ishimaru |
| 2005/0071935 A1* | 4/2005 | Shah .................. A43D 1/025 |
| | | 12/146 L |
| 2007/0039209 A1 | 2/2007 | White et al. |
| 2008/0292179 A1 | 11/2008 | Busch |
| 2010/0229422 A1 | 9/2010 | Goonetilleke et al. |
| 2014/0285646 A1 | 9/2014 | Kahlon |
| 2015/0101133 A1 | 4/2015 | Manz et al. |
| 2015/0101134 A1 | 4/2015 | Manz et al. |
| 2016/0125499 A1 | 5/2016 | Gooch et al. |
| 2017/0055629 A1 | 3/2017 | Schickling |
| 2017/0255185 A1 | 9/2017 | Hinshaw |
| 2017/0308945 A1 | 10/2017 | Loveder et al. |

FOREIGN PATENT DOCUMENTS

| | | |
|---|---|---|
| DE | 10 2012 009 606 A1 | 11/2012 |
| DE | 10 2013 221 018 A1 | 4/2015 |
| DE | 10 2013 221 020 A1 | 4/2015 |
| EP | 0 019 459 A1 | 11/1980 |
| JP | 2001-204512 A | 7/2001 |
| JP | 2005-169015 A | 6/2005 |
| WO | WO 2007/021865 A2 | 2/2007 |
| WO | WO 2011/061714 A1 | 5/2011 |
| WO | WO 2014/014977 A2 | 1/2014 |
| WO | WO 2014/100824 A1 | 6/2014 |
| WO | WO 2015/123518 A1 | 8/2015 |
| WO | WO 2015/169942 A1 | 11/2015 |
| WO | WO 2017/182930 A2 | 10/2017 |

* cited by examiner

DIGITAL LAST

CROSS-REFERENCE TO RELATED APPLICATIONS

This application claims priority to German application 10 2016 205 503.8, filed Apr. 4, 2016, which is incorporate herein in its entirety by reference thereto.

BACKGROUND OF THE INVENTION

Field of the Invention

The present invention relates to a method and apparatus for generating a digital last for the manufacture of a shoe, in particular of a sports shoe.

Background

A last for a shoe is typically a mechanical form that has a shape adapted to form a shoe around it and which, when removed from the shoe, leaves a cavity for the reception of a human foot. Shoemakers use lasts for the manufacture of shoes. As such, it has been known for a long time to use lasts specifically made for a person's foot to manufacture a shoe.

However, nowadays shoes are typically mass products which do not take into account specific properties of a person's foot, mainly due to complexity and costs. Rather, lasts are usually provided based on average foot sizes and shapes. For instance, a shoe having a specific size (for instance, a running shoe having men's size 10) is manufactured using a last having a shape corresponding to average men's feet having the specific size of the shoe.

It is apparent that any deviation of a person's foot from the average foot shape (such as broader or narrower shape of the foot) cannot easily be taken into account for a mass product due to increased complexity and costs of the production of the shoes. Also, different persons may have different preferences regarding the fit of shoes which may not be reflected by a standard shoe that has been manufactured based on average values.

Consequently, one trend in manufacturing aims at producing articles which are adapted to the person's needs. With respect to shoes, several approaches are known in the prior art.

For instance, the US patent application publication US 2010/0229422 A1 discloses a customized shoe and insole, in particular a method and apparatus for determining the shape of a foot and for making a shoe or insole. In this publication, it is disclosed that a foot shape can be captured by scanning with an optical or mechanical probe or scanner. The determined shape can then be slapped-on to the bottom of a 3D representation of an existing last.

The Chinese patent application publication CN 101711614 A discloses a customized insole image sensing system and method. To this end, tested foot shape and shoe shape information are converted into customized insole manufacturing information. The Japanese patent application publication JP 2005-169015 A also discloses the measurement of foot dimensions for selecting an appropriately sized shoe.

The international patent application publication WO 2007/021865 A discusses a custom fit system with an adjustable last. After the length size is calculated, the appropriately sized shoe and last are assembled together and subject to infrared radiation until a heat malleable material becomes plastic. Adjustments are then made to the last in accordance with adjustment factors to provide custom width sizing.

However, none of the approaches known from the prior art allow for a cost efficient manufacture of lasts and shoes by taking into account the specific properties of a person's feet, so as to provide a well-fitting, easily manufactured shoe.

It is therefore the technical problem underlying the present invention to provide a method and apparatus for a cost efficient manufacture of shoes by taking into account the specific properties of a person's feet, so as to provide a well-fitting, easily manufactured shoe, thereby overcoming the disadvantages of the prior art at least in part.

BRIEF SUMMARY OF THE INVENTION

This problem is solved by the subject matter of the independent claims, in particular by a method for generating a digital last for the manufacture of a shoe for a person, the method comprising obtaining a predefined digital last, the predefined digital last comprising an axis relating to the shape of the last; obtaining data of a foot of the person; and modifying the obtained predefined digital last based on the obtained data, wherein modifying comprises at least one of translation and rotation of the axis.

The above approach allows for an efficient manufacture of shoes based on a digitally adapted last because it is possible to modify an existing predefined last, which is present as digital data, to the person's feet. This modification may take into account various parameters (for instance, longitudinal axes, transverse axes, and/or angles, as discussed in further detail below) so as to finely modify the predefined last to optimally fit to the person's foot. By rotating an axis of the digital last it is possible to adjust not only the length or the width of the last, but also the bending of a foot or a part thereof, e.g., in the forefoot area. The inventors have determined that rotating, and/or modifying the length of, and/or translating a single transverse axis of a last permit to obtain an improved fit of shoes. Therefore digital last data and physical last may be adapted to maximize fit of shoes with minimal modifications. Therefore, by a single, simple operation, a last may be modified so as to create an improved fit to a person's foot. Another advantage of this concept is that a physical last may not be necessary at all for manufacturing a shoe. For example, modern techniques such as 3D printing or knitting may be used instead of manufacturing a shoe around a physical last.

It is preferred if one axis of the predefined digital last is translated/and or rotated so as to align with a corresponding axis included in the data of the foot. In one example, alignment means that an axis is translated and/or rotated so that it is parallel to the corresponding axis in the data of the foot. When bringing corresponding axes into alignment by means of rotation, it is possible to provide for an optimal anatomic adaptation of the person's foot to a last and eventually to a shoe. It is to be understood that the alignment of axes in terms of rotation and/or translation need not be exact. Rather, a margin is conceivable wherein the orientation of an axis of the digital last is aligned such that the angle it forms with a corresponding axis of the data of the foot of the person is between +4° and −4°. In contrast, when only considering changes in the size (such as the length of the shoe), it is not possible to correct for misalignment of the foot. Such misalignments are typically not taken into account when manufacturing mass produced shoes.

It is also conceivable to vary the length of said or another axis of the predefined digital last to correspond to the length of the corresponding axis included in the data of the foot. When referring to a length of an axis herein it is to be understood that this corresponds a segment of an axis, i.e., a defined distance along the axis. By not only relying on a rotation, but additional modification of the length of an axis (e.g., the length of an axis could be increased or decreased, depending on the data of the foot) it is possible to obtain a better fit from an existing and predefined last.

Moreover, an axis to be modified corresponds to a transverse axis of the foot of the person, wherein the transverse axis of the foot is formed by the straight connection between the first metatarsophalangeal joint and the fifth metatarsophalangeal joint of the foot of the person. For example, the modified (by translation and/or rotation) transverse axis of the digital last may be less than 4.0%, in particular less than 2.5% behind or before the transverse axis of the foot. This allows for a good and comfortable rolling of the foot. Using a transverse axis based on this definition allows the modification of the digital last so as to obtain shoes which bend at the approximate location where the foot bends during dorsiflexion. This will contribute to an improved walking comfort of the wearer of the shoe.

The modifications made to the digital last data, in particular to the orientation and/or length of some axis of the last, may be adapted depending on the sport they are destined to and/or adapted depending on the shoe model and/or adapted depending on some customer preferences and/or the sex of the person. For example a deviation by 6 mm between the foot and the last along a given axis of the last would correspond to modification by 3 mm in a given sport or 5 mm in another sport.

In one example, the transverse axis of the foot is determined by applying tangents on the medial and on the lateral sides of an image of the foot of the person. In particular, a first tangent may be placed on the medial side of the foot so as to contact one point in the heel area and one point in the forefoot area, regardless of the midfoot shape, and second tangent is placed on the lateral side of the foot so as to contact one point in the heel area and one point in the forefoot area, regardless of the midfoot shape. In some cases one point of the lateral side of the 'print' or projection of the forefoot when applied on a surface may be used. The points of contact between the tangents and the forefoot portion correspond to the first metatarsophalangeal joint (also referred to as MMPJ1) on the medial side and to the fifth metatarsophalangeal joint (also referred to as MMPJ5) on the lateral side.

According to the invention, the digital last is beneficially modified based on the position and/or arrangement and/or shape of anatomical landmarks of the foot of a person.

In another example, it is possible to modify a forefoot longitudinal axis of the foot of the person. In one example, the forefoot longitudinal axis may be determined by the steps of determining the center of the first, second and fifth toes, by tracing a parabola which connects the three determined center points, by determining the vertex of the parabola, and wherein the forefoot longitudinal axis is the line connecting the middle of the transverse axis and the vertex of the parabola. The forefoot axis therefore runs between the tip of the foot (at the toes) and the transverse axis. As described above, it is possible to rotate the forefoot axis of the digital last so as to correspond to that of the person's foot. It is also possible, to translate the forefoot axis of the digital last, and/or to modify its length. Of course, these modifications can be done in connection with any of the other modifications described herein.

The position of the center of the first, second and fifth toes may be identified by placing circles around each of the pressure areas formed by the toes on a foot-scanning device.

In a further example, modifying the digital last may also comprise modifying a rearfoot longitudinal axis. The rearfoot longitudinal axis of the foot of the person may be obtained by determining the medium line between the middle of the transverse axis and the center of the heel line. The heel line may be obtained by taking the tangents on the medial and on the lateral sides of an image of the foot of the person, as discussed above. Then, an orthogonal line to the medial tangent with one touchpoint on the heel is created. The center (midpoint) of this orthogonal line is then used for the rearfoot longitudinal axis. As discussed above, it is possible to rotate the rearfoot axis of the digital last so as to correspond to that of the person's foot. It is also possible, to translate the rearfoot axis of the digital last, and/or to modify its length. Of course, this can be done in connection with any of the other modifications described herein, on the transverse axis or on the forefoot axis, such as varying the length of one or more axes, translating one or more axis, rotating one or more axis, and so on.

In an example, modifying the digital last may further comprise determining a forefoot angle of the foot of the person, wherein the forefoot angle is the angle between the forefoot longitudinal axis and the transverse axis of the foot of the person. This angle allows for a rotation of the transverse axis and of the forefoot longitudinal axis of the corresponding digital last. This means that the corresponding angle of the digital last (referred to as angle $\alpha$) remains constant, and that the respective axes (forefoot longitudinal axis and the transverse axis) of the digital last are rotated by an angle $\beta$. For example, the angle $\alpha$ of the digital last may be rotated by an angle $\beta$ to match the corresponding angle between the transverse axis and at least one longitudinal axis of the foot so that the difference is less than 4°. Of course, it is also conceivable, alternatively or in addition, to rotate one or more of the forefoot axis and the transverse axis.

Moreover, it is conceivable that the digital last further comprises information about the forefoot portion of the digital last, in particular about the shape of a footwear last bottom pattern and about the forefoot width of the digital last, wherein the forefoot width corresponds to the length of the transverse axis of the foot. By providing additional data of the foot of a person, it is possible to further improve the modification of the predefined digital last. In general, and in accordance with all examples described herein, it is conceivable that multiple adjustments (e.g., of one or more angles and/or one or more length of axes) may be made so as to provide an adjusted digital last matching the properties of the foot of the person.

Moreover, it is conceivable that the digital last further comprises information about the midfoot portion of the digital last, in particular about the midfoot width of the digital last, wherein the midfoot width corresponds to the length of a midfoot axis measured at between 35% and 55%, for example at 41%, of the foot longitudinal axis.

In one example, the determination of a rearfoot distance of the foot of the person may be determined. The rearfoot distance is the distance between the transverse axis and the heel of the foot of the person. Thus, the digital last may be modified by varying the rearfoot distance of the digital last to correspond to the rearfoot distance of the foot of the person.

In another example, the heel of the foot of the person serves as the reference point for an alignment between the digital last and the foot of the person. The center of the heel is a fixed point that can easily be determined and therefore be used for determining and carrying out additional modifications to the digital last. The center of the heel of a foot may be determined by placing a circle corresponding to the pressure exerted by the heel, visible on an image of a foot obtained by a foot-scanning device.

Furthermore the shape of the heel of a person may also be measured, characterized, and such measures and characterization be used to modify a digital last. More particularly a heel of a person may be prominent, normal or flat and a digital last data may be adapted depending on each type of heel.

A foot-scanning device permits obtaining an image of the foot of the person. In one example, an image is obtained by a static or a dynamic scan of the foot of the person. Such a scan can be obtained by optical means such as a scanner which is based on laser light. However, the scan may also be obtained by other means such as a CCD camera or a pressure sensitive surface, or even based on mechanical measurements. Such mechanical measurements could subsequently be translated into digital data to be used for the modification of an existing digital last. In another example, the image is used for determining at least one axis of the foot of the person. Determining a dynamic scan (i.e., during movement such as walking or running or performing a typical movement for which the shoe is to be used) or a static scan (i.e., while the person stands without moving) influences the parameters to be used for the modification. Using a dynamic scan may be advantageous if the intended use of the shoe requires uncommon movements. For example, climbing shoes are usually subject to different movements of the feet than a running shoe. Dynamic scans can be carried out in various ways. For example a dynamic scan may be obtained by motion capturing, based on optical sensors or radiofrequency beacons.

In addition to the above described rotation of an axis and other modification of axes or angles, the digital last may also be modified so as to align with the foot of the person based on the image. By using the image, further data may be included in the modification thus leading to an improved modification of the digital last.

In one example, the intended use of the shoe may be taken into account for modifying the digital last. As briefly mentioned above, certain sports require typical movements of the feet of a person, and consequently, a different modification of the last may be desirable. As an example, a specific shoe (such as a climbing shoe) may typically require a very tight fit, which could reduce the wearing comfort of the shoe for other purposes such as walking. On the other hand, walking shoes may have a somewhat looser but more comfortable fit. Thus, by taking into account the intended use of the shoe, the selection of an appropriate predefined digital last and subsequent modification thereof may be improved.

According to another example, it is also conceivable to consider the material of the shoe and/or the upper of the shoe for modifying the digital last. As an example, a more stretchable material may lead to tighter designs of the modified last due to the properties of the material.

Further to the above mentioned consideration of the intended use of the shoe, the placement of at least one cleat could also be determined based on the data of the foot of the person. As an example, a medial stud can be provided under metatarsal head and on the flex line (which is the line where the foot bends while rolling off), a lateral stud can be placed on the lateral side of the flex line (in one example, up to 5° anterior to the flex line), and a middle stud can be placed in the middle between the medial and the lateral stud. To this end, a better fit traction, and functional flexibility may be provided than in common approaches where the cleats are mounted to predefined positions, e.g., farther distances to the posterior or anterior of the flex line. In fact, non-optimal placement of cleats under the foot may lead to worse performance or even to injuries of the wearer. Thus, by placing cleats based on the modified digital last, the health and performance of a wearer may be improved.

In one example, the data of the digital last may be obtained from measuring a footwear last and/or from a database comprising at least one predefined digital lasts. Thus, existing and well-tried lasts may be digitized and used as a basis for subsequent modification to a wearer's needs. Moreover, a database may comprise a plurality of predefined digital lasts. Based on the wearer, an optimal last for subsequent modification may be selected. For instance, such selection may be based on whether the wearer's foot has some kind of deformation such as flat feet, high arch, and so on. By selecting an optimal predefined digital last for modification it may be avoided that the last has to be distorted too severely.

By using the modified digital last as described herein, a physical last may be manufactured. Methods for manufacturing a last are in principle known to the skilled person. However, as it is conceivable to use the methods and apparatus described herein for the manufacture of lasts and shoes on-demand and probably in-store. A last could for instance be manufactured using the technique of 3D-printing. This method allows for fast, exact, and convenient manufacture of a (physical) last based on the modified digital last. Another alternative is using a (bigger) specimen last and milling it out to obtain a customized last which can be used for manufacturing a shoe.

Based on the modified digital last obtained by the methods and apparatus described herein, a shoe may be manufactured. Methods for producing a shoe are generally known to the skilled person. However, in the context of the present invention it may be advantageous to be able to produce the shoe directly at a shop (as opposed to have the shoe produced at a different location, in particular a different country). Machines for manufacturing shoes for this purpose are known, e.g., from the patent applications by Applicant, disclosed e.g., by the German patent applications DE 10 2013 221 018 or DE 10 2013 221 020.

The present invention also foresees a computer-program comprising instructions for performing a method according to any of method steps described herein.

BRIEF DESCRIPTION OF THE DRAWINGS/FIGURES

Exemplary examples of the present invention will be discussed in the following detailed description with reference to the figures, wherein.

DETAILED DESCRIPTION OF THE INVENTION

Figure 1:
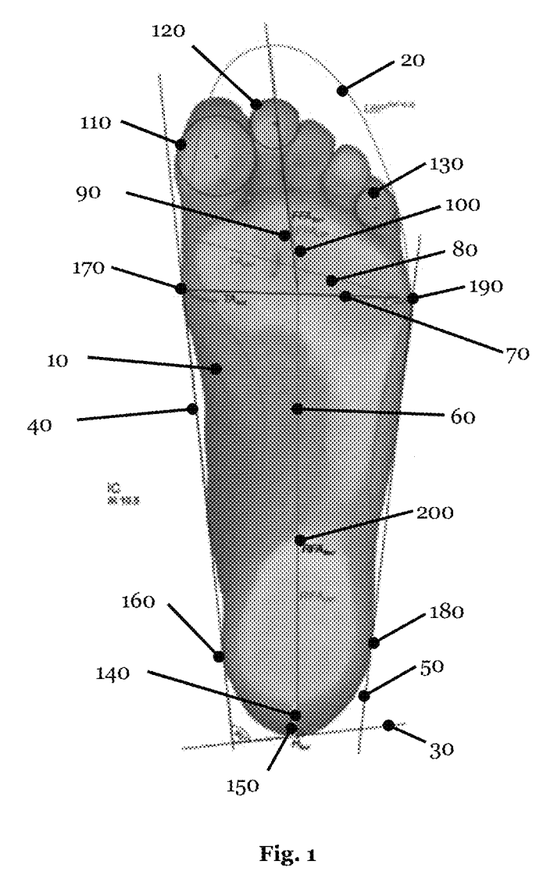
FIG. 1 shows the bottom of a foot and a lower bottom pattern in accordance with some embodiments.

FIG. 1 shows the bottom 10 of a human foot as well as the contour of a last, in particular a lower bottom pattern 20 (also referred to as LBP) of the last. A heel line 30 is shown which corresponds to a tangent at the rearmost point of the heel when the contour of the foot is projected onto the ground (see also FIG. 4 below). Moreover, a medial tangent line 40 and a lateral tangent line 50 are illustrated. The medial tangent line contacts one point 160 in the heel area and one point in the forefoot area 170. The lateral tangent line 50 contacts one point 180 in the heel area and one point in the forefoot area 190. The medial and lateral tangent lines can be used to obtain the location of the metatarsophalangeal joint I (also referred to as MMPJ1) (medial) and of the metatarsophalangeal joints V (also referred to as MMPJ5) (lateral). MMPJ1 and MMPJ5 are generally about on the axis comprising the contact points 170, 190 of the medial and lateral tangent lines 40 and 50 in the forefoot area. The transverse axis (TAfoot) 70 passing by the MMPJ1 and MMPJ5 can then be determined as the axis comprising said contact points 170, 190. In particular, the determination of the contact points is made regardless of the midfoot shape on the medial and on the lateral sides. FIG. 1 also shows a forefoot axis (FFAfoot) 90. The FFAfoot may be determined by finding the center of the first toe 110, the center of the second toe 120 and the center of the fifth toe 130. The center of a toe can be approximated by the approximating the contact surface of the toe with a circle and using the center of this circle. Then a parabola (not shown) is traced which joins the three center points. Methods for fitting a parabola to points are known to the skilled person. Thereafter, the vertex of the parabola is determined. The FFAfoot 90 then corresponds to the line joining the middle of the transverse axis 70 to the vertex of the parabola. Moreover, a rearfoot axis 60 (RFAfoot) of the foot may be determined which is the medium line between the middle of the TAfoot 70 and the middle of the back (heel) line 30 of the foot.

With respect to FIG. 1, the digital last includes a transverse axis 80 (TAlbp), a forefoot axis 100 (FFAlbp) and a rearfoot axis 200 (RFAlbp)

As can be seen from FIG. 1, there is a shift 150 between the rear end 140 of the last bottom pattern and the rear portion of the heel of the foot. This shift is due to the projection of the foot into a plane (see also FIG. 4 below).

Figure 2:
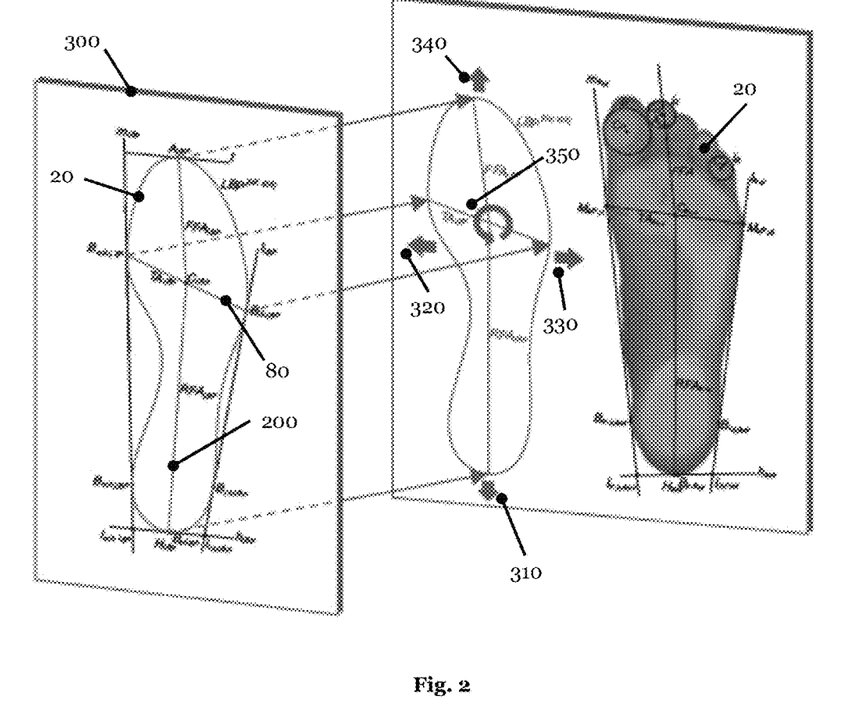
FIG. 2 shows various axes and angles and modifications thereof in accordance with some embodiments.

FIG. 2 shows an example of a modification of a predefined digital last 300. As discussed above with respect to FIG. 1, the digital last may include data comprising the rearfoot axis RFAlbp 200, the forefoot axis FFAlbp 100, the transverse axis TAlbp 80, and the shape of the lower bottom pattern of the digital last 20.

Based on the data obtained from a foot of a person, the digital last may then be modified accordingly. As illustrated in the example of FIG. 2, the modification may include the rotation 350 of one or more axes. For example, it is possible to rotate the FFAlbp 100 with respect to the TAlbp 80 or the RFAlbp 200 may be rotated with respect to the TAlbp 80. Of course, it is also possible to rotate both the FFAlbp 100 and the RFAlbp 200 relative to the TAlbp 80. The rotation may occur in the same direction (e.g., either clockwise or counter-clockwise) or in different directions.

Furthermore, the width of the digital last in the forefoot area may be adjusted by varying the length of the transverse axis TAlbp 80 on the medial side 320 or on the lateral side 330 or on both sides. Similar modifications may be made to the forefoot axis FFAlbp 100 and/or to the rearfoot axis RFAlbp 200 as illustrated by the reference signs 310 and 340. Varying the length of an axis herein means increasing or decreasing the length of the axis. A variation of the length and/or a rotation of an axis may be applied to any axis described herein. In this way, a very fine-grained modification of a predefined digital last may be achieved so as to optimally adjust the predefined last to a person's foot 20.

Figure 3:
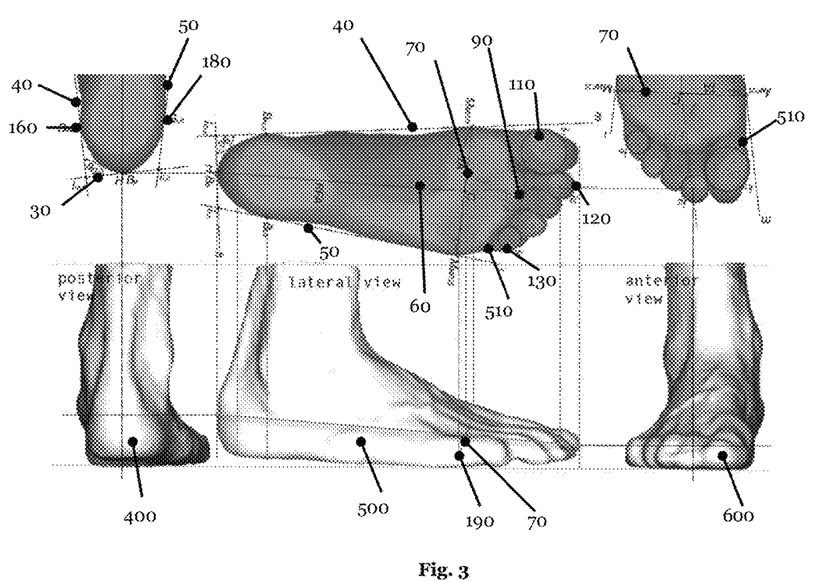
FIG. 3 shows a posterior view, a lateral view, and an anterior view of a foot in accordance with some embodiments.

FIG. 3 shows a posterior view 400, a lateral view 500, and an anterior view 600 of a foot. Further, the positions of various axes with respect to the foot are illustrated. In particular, in the left portion of FIG. 3 showing the posterior view, the contact points 160 and 180 of the medial and lateral tangents 40 and 50 are shown, which may be used for determining the transverse axis TAfoot 70. The posterior view also shows the heel line 30, which may be defined by a tangent on the rearmost point of the foot when projected onto the ground.

The illustrations regarding the lateral view 500 show the position of the transverse axis TAfoot 70 of the foot, which is defined by the contact points 170, 190 of the medial and lateral tangents in the forefoot region. The contact point of the heel axis 30 with the foot may also be used as starting point of the rearfoot axis RFAfoot 60. The end point of RFAfoot 60 may be the middle of TAfoot 70, as discussed above. In particular, the central portion of FIG. 3 illustrates the determination of the end point of FFAfoot 90. This may be done via determining the center of the first 110, second 120 and fifth 130 toes, by tracing a parabola 510 which connects the three determined center points, by determining the vertex of the parabola 510, and wherein the forefoot longitudinal axis FFAfoot 90 is the line connecting the middle of the transverse axis TAfoot 70 and the vertex of the parabola 510. The forefoot axis FFAfoot therefore runs between the tip of the foot (at the toes) and the transverse axis TAfoot 70. It is also conceivable to use a different number of toes (e.g., two or four) for determining a curve that is then used for the determination of the end point of the forefoot axis FFAfoot 90 (the start point is the middle of the transverse axis TAfoot 70).

The right portion of FIG. 3 shows an anterior view 600 of the foot. The upper part of this view shows the position and determination of the parabola 510 the determination of the endpoint of the FFAfoot 90 in more detail.

Figure 4:
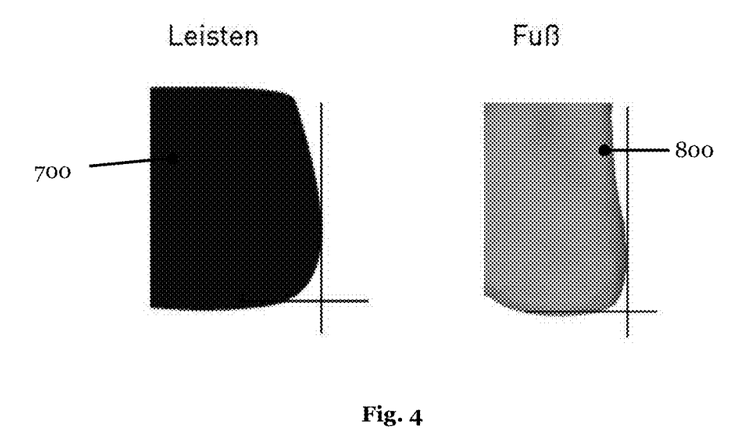
FIG. 4 shows a modification of a last based on a measured parameter relating to the heel of a foot.

FIG. 4 shows a lateral view of a last 700 and a foot 800. As can be seen, the portion of the foot contacting the ground is not the same as the surface which may be obtained by projecting the foot onto the ground. This is mainly due to the shape of the heel. To this end, the digital last may be modified accordingly by taking this difference (described by reference sign 150 with respect to FIG. 1 above) into account.

Figure 5:
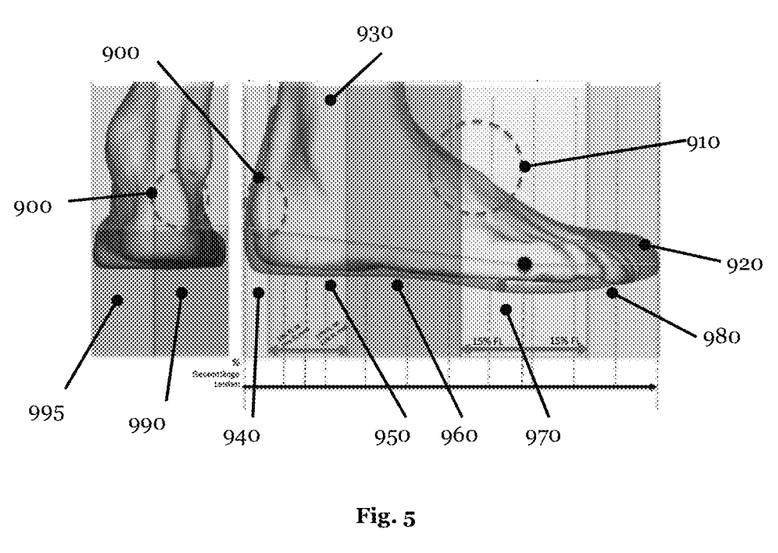
FIG. 5 shows the segments of a foot and a last and sections which may be modified in accordance with some embodiments.

FIG. 5 shows a posterior and lateral view of a foot. Three circles have been added which show portions of a three dimensional digital last which may additionally be modified in one example. In this case, not only the lower bottom pattern of the last is modified, but also portion 900 on the heel and portion 910 on the instep of the foot. In one example, a ganglion on the instep of the foot could be taken into account when preparing the three dimensional digital last. In one example, adjustments to the digital lasts can be made using CAD (computer aided design) technology.

As described with reference to FIG. 5, it is also conceivable to make any adjustments to the last 920 using parameterized segments of the last 920. As an example, a last 920 can be segmented (based on the foot 930 of the person) into a heel segment 940, an ankle segment 950, a midfoot segment 960, a forefoot segment 970, and a toe segment 980. In addition, each of the segments can be defined for a lateral 990 and a medial 995 portion of the foot. Of course, a finer granularity of the segments is also conceivable. In one example, the segmenting may depend on the intended use of the shoe (e.g., soccer shoe having cleats as opposed to a running shoe).

Figure 6:
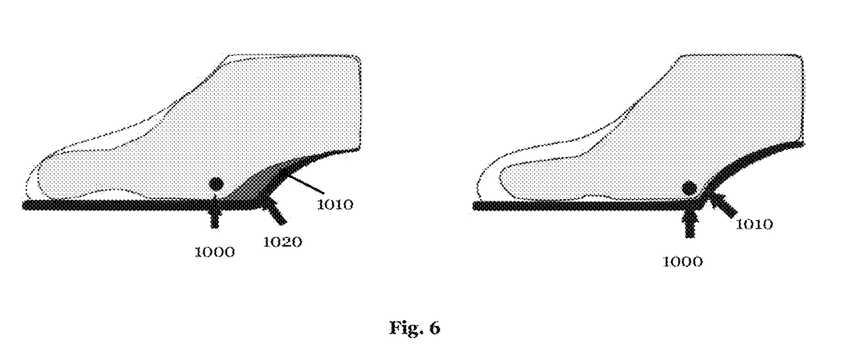
FIG. 6 shows the front part of a foot in a shoe during dorsiflexion and conditions for different fits of the shoe.

FIG. 6 shows the front part of a foot in a shoe during dorsiflexion. As shown in FIG. 6, segmenting may be helpful to precisely determine a proper fit of the shoe based on the digital last. Many injuries and foot deformities in football are caused by improper fit of the footwear. Due to the fact of preferring a snug fit, players tend to wear their shoes too tight. For instance, different heel-to-toe-measurements can lead to a mismatch of foot anatomy and shoe. The adaptation of the forefoot to the rearfoot portion on the last (e.g., based on the above described segmenting) might therefore solve a considerable number of issues regarding shoe fit and can lead to an improved behavior while dorsiflexion at push-off. In the left part of FIG. 6 can be seen that there is too much space 1020 between the ball area 1000 of the foot and the shoe 1010 while dorsiflexion. In contrast, the right part of FIG. 6 shows an improved (narrow) fit between the ball area 1000 of the foot and the shoe 1010 while dorsiflexion.

The various parameters, axes, points and angles described herein may be used alone or in any combination so as to modify a digital last to match corresponding parameters of a foot. To this end, the lengths of one or more axes may be varied (i.e., increased or decreased), axes may be rotated by any angle, and/or contact points at the foot may be determined.

Moreover some techniques such as PCA and/or ICP may be used to align the data of the digital last.

What is claimed is:

1. A method for generating a digital last for the manufacture of a shoe for a person, the method comprising:
    obtaining a predefined digital last, the predefined digital last comprising an axis relating to the shape of the last;
    obtaining data of a foot of the person; and
    modifying the obtained predefined digital last based on the obtained data, wherein modifying comprises at least one of translation and rotation of the axis, wherein the axis to be modified corresponds to a transverse axis of the foot of the person, wherein the transverse axis of the foot is formed by the straight connection between a first metatarsophalangeal joint and a fifth metatarsophalangeal joint of the foot of the person.

2. The method according to claim 1, wherein the axis of the predefined digital last is translated and/or rotated so as to align with a corresponding axis included in the data of the foot.

3. The method according to claim 2, wherein the modified transverse axis of the digital last is translated and/or rotated so as to be less than 2.5% behind or before the transverse axis of the foot.

4. The method according to claim 1, further comprising modifying a rearfoot longitudinal axis, wherein the rearfoot longitudinal axis of the foot of the person is obtained by determining a medium line between the middle of the transverse axis and the middle of a heel line.

5. The method according to claim 1, wherein the digital last further comprises a footwear last bottom pattern and a forefoot width of the digital last, wherein the forefoot width corresponds to the length of the transverse axis of the foot.

6. The method according to claim 1, further comprising determining a rearfoot distance of the foot of the person, wherein the rearfoot distance is the distance between the transverse axis and the heel of the foot of the person.

7. The method according to claim 6, further comprising modifying the digital last by modifying the rearfoot distance to correspond to the rearfoot distance of the foot of the person.

8. The method according to claim 1, wherein a heel of the foot is a reference point for an alignment between the digital last and the foot of the person.

9. The method according to claim 1, wherein the digital last is modified in view of the purpose of the shoe.

10. The method according to claim 1, wherein the digital last is modified in view of the material of the shoe.

11. The method according to claim 1, wherein the placement of at least one cleat is determined based on the data of the foot of the person.

12. A method for manufacturing a last of a shoe based on a digital last obtained by the method according to claim 1.

13. The method according to claim 1 further comprising manufacturing a deformable last based on the digital last.

* * * * *